US010169308B1

(12) United States Patent
Mizhen et al.

(10) Patent No.: US 10,169,308 B1
(45) Date of Patent: Jan. 1, 2019

(54) METHOD AND SYSTEM FOR CREATING AN ONLINE STORE

(71) Applicant: GOOGLE INC., Mountain View, CA (US)

(72) Inventors: Boris Mizhen, Brooklyn, NY (US); Hsiao-Chien Lin, New York, NY (US); Heather Folsom, Palo Alto, CA (US); Mike Giardina, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 663 days.

(21) Appl. No.: 14/206,970

(22) Filed: Mar. 12, 2014

Related U.S. Application Data

(63) Continuation of application No. 12/727,486, filed on Mar. 19, 2010, now abandoned.

(51) Int. Cl.
*G06Q 30/00* (2012.01)
*G06F 17/22* (2006.01)
*G06F 3/0484* (2013.01)
*H04L 29/06* (2006.01)

(52) U.S. Cl.
CPC ........ *G06F 17/2247* (2013.01); *G06F 3/0484* (2013.01); *H04L 65/40* (2013.01)

(58) Field of Classification Search
CPC ............................... G06Q 30/06; G06Q 30/00
USPC ................................................. 705/26.1, 27.1
See application file for complete search history.

(56) References Cited

U.S. PATENT DOCUMENTS 5,987,132 A   11/1999  Rowney
6,128,600 A   10/2000  Imamura et al.
6,223,094 B1   4/2001  Muehleck et al.
6,631,356 B1  10/2003  Van Horn et al.
6,847,972 B1   1/2005  Vernau et al.
(Continued)

FOREIGN PATENT DOCUMENTS

JP   2009-026195 A   2/2009
KR   10-2009-0002145 A   1/2009
KR   10-2009-0076575 A   7/2009

OTHER PUBLICATIONS

Title: Macy's Publication, Jan. 15, 2009 (Way Back Machine) https://web.archive.org/web/20090115100935/http://www1.macys.com/catalog/product/index.ognc?ID=283686&CategoryID=330, Date: Jan. 15, 2009.
(Continued)

*Primary Examiner* — Brandy A Zukanovich
(74) *Attorney, Agent, or Firm* — Johnson, Marcou & Isaacs, LLC

(57) ABSTRACT

Automated systems for allowing a user to quickly and easily create an online store having inventory management and payment processing capabilities. An online store generator can provide a user interface for a user to provide product and optionally inventory information for the product(s). The online store generator can display a preview of the online store using the product information and a predefined template. The user can then customize aspects of the online store, such as the size and appearance of the online store via the user interface. The online store generator can then use the product information and the customizations received from the user to generate computer program code, such as JavaScript, that can be embedded in an Internet website. The user can export the code into an Internet website to render a functional online store.

6 Claims, 8 Drawing Sheets

(56) References Cited

U.S. PATENT DOCUMENTS

| | | |
|---|---|---|
| 6,868,393 B1 | 3/2005 | Demsky et al. |
| 7,107,230 B1 | 9/2006 | Halbert et al. |
| 7,433,845 B1 | 10/2008 | Flitcroft et al. |
| 7,647,247 B2 | 1/2010 | Abraham et al. |
| 7,805,337 B1 | 9/2010 | Ogg |
| 7,895,080 B2 | 2/2011 | Haynes et al. |
| 8,285,589 B2 | 10/2012 | Snodgrass et al. |
| 2001/0029478 A1 | 10/2001 | Laster et al. |
| 2001/0042024 A1 | 11/2001 | Rogers |
| 2001/0049699 A1 | 12/2001 | Pratley et al. |
| 2001/0056485 A1 | 12/2001 | Barrett et al. |
| 2002/0029209 A1 | 3/2002 | Bernal et al. |
| 2002/0055954 A1 | 5/2002 | Breuer et al. |
| 2002/0091728 A1 | 7/2002 | Kjaer et al. |
| 2002/0111877 A1 | 8/2002 | Nelson |
| 2002/0116163 A1 | 8/2002 | Loveland et al. |
| 2002/0154114 A1 | 10/2002 | Christensen et al. |
| 2002/0156684 A1 | 10/2002 | Stone et al. |
| 2002/0156694 A1 | 10/2002 | Christensen et al. |
| 2002/0158765 A1 | 10/2002 | Pape et al. |
| 2002/0194095 A1 | 12/2002 | Koren et al. |
| 2003/0014317 A1 | 1/2003 | Siegel et al. |
| 2004/0015408 A1 | 1/2004 | Rauen, IV et al. |
| 2004/0034615 A1 | 2/2004 | Thomson et al. |
| 2004/0066413 A1 | 4/2004 | Ahlqvist |
| 2004/0117271 A1 | 6/2004 | Knight et al. |
| 2004/0122691 A1 | 6/2004 | Lupp et al. |
| 2004/0143600 A1 | 7/2004 | Musgrove et al. |
| 2005/0065881 A1 | 3/2005 | Li et al. |
| 2005/0071251 A1 | 3/2005 | Linden et al. |
| 2005/0154974 A1 | 7/2005 | Gao et al. |
| 2005/0268255 A1 | 12/2005 | Hrastnik et al. |
| 2005/0289158 A1 | 12/2005 | Weiss et al. |
| 2006/0059135 A1 | 3/2006 | Palmon et al. |
| 2006/0136808 A1 | 6/2006 | Chirilov |
| 2006/0190350 A1 | 8/2006 | Maas |
| 2006/0218052 A1 | 9/2006 | Haynes et al. |
| 2006/0282345 A1 | 12/2006 | Nelson |
| 2006/0288267 A1 | 12/2006 | DeSpain et al. |
| 2006/0289637 A1 | 12/2006 | Brice et al. |
| 2007/0050697 A1 | 3/2007 | Lewis-Bowen et al. |
| 2007/0088723 A1 | 4/2007 | Fish et al. |
| 2007/0112643 A1 | 5/2007 | Veres et al. |
| 2007/0124216 A1 | 5/2007 | Lucas |
| 2007/0179835 A1 | 8/2007 | Finley et al. |
| 2007/0179837 A1 | 8/2007 | Finley et al. |
| 2007/0250705 A1 | 10/2007 | Smith et al. |
| 2007/0265922 A1 | 11/2007 | Dumond et al. |
| 2007/0271134 A1* | 11/2007 | Ferry .................... G06Q 30/02 705/14.61 |
| 2007/0299736 A1 | 12/2007 | Perrochon et al. |
| 2008/0015988 A1 | 1/2008 | Brown et al. |
| 2008/0065502 A1 | 3/2008 | Diaz Perez |
| 2008/0189232 A1 | 8/2008 | Dunning et al. |
| 2008/0255945 A1 | 10/2008 | Percival et al. |
| 2009/0138380 A1 | 5/2009 | Roseman et al. |
| 2009/0150266 A1 | 6/2009 | Dickelman |
| 2009/0157472 A1 | 6/2009 | Burazin et al. |
| 2009/0187583 A1 | 7/2009 | Pape et al. |
| 2009/0198596 A1 | 8/2009 | Dolan et al. |
| 2009/0204510 A1 | 8/2009 | Hwang |
| 2010/0108707 A1 | 5/2010 | Ruman et al. |
| 2010/0114704 A1 | 5/2010 | Steelberg et al. |
| 2011/0119222 A1* | 5/2011 | Rosinski ............... H04W 16/18 706/50 |
| 2011/0161182 A1 | 6/2011 | Racco |
| 2011/0161802 A1* | 6/2011 | Jia .......................... G06F 17/24 715/235 |
| 2011/0185305 A1 | 7/2011 | Lai et al. |
| 2012/0203760 A1 | 8/2012 | Abraham et al. |

OTHER PUBLICATIONS

Author: Iwarere, O., Title: Office Action cited in copending U.S. Appl. No. 12/950,655, filed Nov. 19, 2010, pp. 1-12, dated Aug. 7, 2014.

U.S. Appl. No. 12/950,655 to Mizhen, filed Nov. 19, 2010.

U.S. Appl. No. 12/727,486 to Mizhen et al., filed Mar. 19, 2010.

Title: Internet Article: eBay: Turbo Lister FAQ—Seller Tools retrieved from http://pages.ebay.com/turbolister, Publ: http://pages.ebay.com/turbolister2/faq.html, pp. 1-4, Date: Nov. 30, 2010.

Title: Internet Article: eBay: Turbo Lister—Seller Tools—List Multiple Items and Upload to eBay in Bulk!, Publ: http://pages.ebay.com/turbo_lister, pp. 1-2, Date: Nov. 30, 2010.

Title: U.S. Appl. No. 12/950,655, filed Nov. 19, 2010, pp. 1-45, Date: Nov. 19, 2010.

Title: eBay—Turbo Lister Listing Activity Quick Start Guide, Publ: eBay File Exchange Catalog Listing Template Instructions, vol./Iss:ver. 1.1, pp. 1-8, Date: Apr. 1, 2007.

Author: Iwarere, O., Title: Office Action cited in copending U.S. Appl. No. 12/950,655, filed Nov. 19, 2010, pp. 1-16, dated Aug. 5, 2013.

Author: Iwarere, O., Title: Office Action issued in co-pending U.S. Appl. No. 12/950,655, filed Nov. 19, 2010, pp. 1-10, dated Mar. 19, 2014.

Author: Liu et al., Title: Clustering Billions of Images with Large Scale Nearest Neighbor Search, Publ: IEEE Workshop on Applications of Computer Vision (WACV'07), pp. 1-6, Date: Jan. 1, 2007.

Author: Zukanovich, B., Title: Office Action issued in copending U.S. Appl. No. 12/727,486, filed Mar. 19, 2010, pp. 1-14, dated Dec. 13, 2013.

Author: Zukanovich, B., Title: Office Action issued in copending U.S. Appl. No. 12/727,486, filed Mar. 19, 2010, pp. 1-12, dated Oct. 11, 2012.

Author: Zukanovich, B., Title: Office Action issued in copending U.S. Appl. No. 12/727,486, filed Mar. 19, 2010, pp. 1-16, dated Jun. 27, 2013.

Author: Iwarere, O., Title: Office Action issued in copending U.S. Appl. No. 12/950,655, filed Nov. 19, 2010, pp. 1-12, dated Sep. 1, 2015.

Author: Iwarere, O., Title: Office Action issued in copending U.S. Appl. No. 12/950,655, filed Nov. 19 2010, pp. 1-5, dated May 14, 2015.

Civan, "U.S. Office Action issued in copending U.S. Appl. No. 13/165,761, filed Jun. 21, 2011", dated Oct. 8, 2013, 14 pages.

Civan, "U.S. Office Action issued in copending U.S. Appl. No. 13/165,761, filed Jun. 21, 2011", dated Jun. 12, 2013, 9 pages.

Garg, "Office Action issued in copending U.S. Appl. No. 13/226,333, filed Sep. 6, 2011", dated May 23, 2013, 13 pages.

Garg, "U.S. Office Action issued in copending U.S. Appl. No. 13/226,333, filed Sep. 6, 2011", dated Oct. 4, 2013, 11 pages.

Oh, "International Search Report and Written Opinion issued in International Application No. PCT/US2012/054027", dated Feb. 27, 2013, 9 pages.

* cited by examiner

Fig. 5

| | A | B | C | D | E | F | G | H | I | J | K |
|---|---|---|---|---|---|---|---|---|---|---|---|
| 1 | sku | title | price | description | quantity | image_link | option_name | option | digital | weight | shipping |
| 2 | 1 | Yo-yo toy | $3.99 | These yoyos are made from recycled CD cases! | 1 | https://www.wizarddomain.com/store-images/yoyo.jpg | Color: | red,blue,gr | | | |
| 3 | 2 | blocks | $4 | This is a highly addictive toy. Made from recycled plastic. | 10 | https://www.wizarddomain.com/store-images/blocks.jpg | | | | | |

Fig. 7

Follow these instructions to embed the Online Store into any website that accepts HTML.

1. Copy and paste the HTML snippet below into your website.

```
   <script src="https://www.scriptdomain.com/gadgets/url=https://%3A%2F%2Fwww.wizarddomain.com%2Fservlet.xml%amp;container=gadgetwizard%amp;w=800&h=500%amp;output=js"></script>
   ```

2. You are done! Now you can quickly and easily sell items with your Online Store.

[<< Back]

METHOD AND SYSTEM FOR CREATING AN ONLINE STORE

CROSS REFERENCE TO RELATED APPLICATIONS

This application is a continuation of U.S. patent application Ser. No. 12/727,486, filed Mar. 19, 2010 and entitled "Method and System for Creating an Online Store," the complete disclosure of which is hereby fully incorporated herein by reference.

TECHNICAL FIELD

The present disclosure relates generally to electronic commerce, and more specifically, to systems and methods that allow users to create an online marketplace, such as an online store or online auction, having inventory tracking and payment acceptance capabilities.

BACKGROUND

Electronic commerce, such as online shopping, has been increasingly common since the advent of the Internet. Online shopping websites generally provide a user interface for customers to select products to purchase, and then have their orders processed.

Many large companies have elaborate websites that can track and display inventory and process payments directly at their websites. However, designing and implementing such a website typically requires skilled technical expertise and complicated computer program coding. This process can take months to complete, even for experienced web designers. Further, successful implementation of such a website requires the use of a wide variety of programs and technologies from a wide variety of external sources. Thus, multiple web designers having different backgrounds and different expertise may be required.

Large companies typically have the resources and a need to implement elaborate websites having inventory tracking and payment processing capabilities, among other technologies. However, smaller companies and individual users, such as a person having a blog or a home based business, generally do not have the resources to implement such a website. Further, a smaller company or individual user may not generate enough sales to justify investing the amount of money required.

Therefore, a need exists in the art for an improved means for creating an online store.

SUMMARY

In one exemplary embodiment, a computer-implemented method for creating an online store includes receiving information regarding at least one product to be offered for sale via the online store; providing a user interface that allows a user to customize an appearance of the online store; and generating computer program code that, when included in a website, provides the online store on the website.

In another exemplary embodiment, a system for creating an online store includes a first user interface for receiving information regarding a product a user intends to offer for sale via the online store; a second user interface for presenting a preview of the online store based at least on the information regarding the product and a predefined template and for receiving an instruction from the user to adjust and appearance of the online store; and an online store generator in communication with the first and second user interfaces for generating program code that, when included in a website, provides the online store on the website when the website is accessed.

In yet another exemplary embodiment, a computer program product has a computer-readable storage medium having computer-readable program code embodied therein for creating an online store. The computer program product includes computer-readable program code for receiving information regarding at least one product to be offered for sale via the online store; computer-readable program code for providing a user interface that allows a user to customize the appearance of the online store; and computer-readable program code for generating program code that, when included in a website, provides the online store on the website.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

FIG. 5 is a block diagram depicting a screen image of a graphical user interface for receiving product information from a user, in accordance with certain exemplary embodiments.

FIG. 7 is a block diagram depicting a screen image of a graphical user interface for displaying computer-readable program code, in accordance with certain exemplary embodiments.

DETAILED DESCRIPTION OF EXEMPLARY EMBODIMENTS

Overview

Systems and methods described herein allow a user to create an online marketplace, such as an online store, online auction, or any other type of online marketplace that would be recognized by one of ordinary skill in the art having benefit of the present disclosure The present disclosure discusses an online store only as an example; it is understood that online auctions or other types of marketplaces also can be used, as would be recognized by one of ordinary skill in the art. The online store can include inventory management and payment acceptance functionality. To create an online store, a user can sign up for an account and provide information regarding the online store to an online store generator via an Internet website. For example, the user may provide information regarding products and/or services that the user intends to sell via the online store. In addition, the user may provide inventory information for one or more of the products. As used throughout the specification, the term "products" should be interpreted to include tangible and intangible products, as well as services.

The online store generator also may provide a user interface for the user to preview and customize the appearance of the online store. For example, the user may adjust the size of the online store to fit in a side bar of a blog. The user also may select what product information is displayed by the online store and/or how the product information is displayed. When the user is finished customizing the online store, the online store generator can generate computer-readable program code (e.g., JavaScript) that can be embedded into an Internet website to render a completely functional online store. For example, the user can copy and paste the program code into an existing website to create the online store in that website. Each time the website is accessed, for example by a customer, the program code can access current product and inventory information to display up-to-date product and inventory information on the website.

System Architecture

Figure 1:
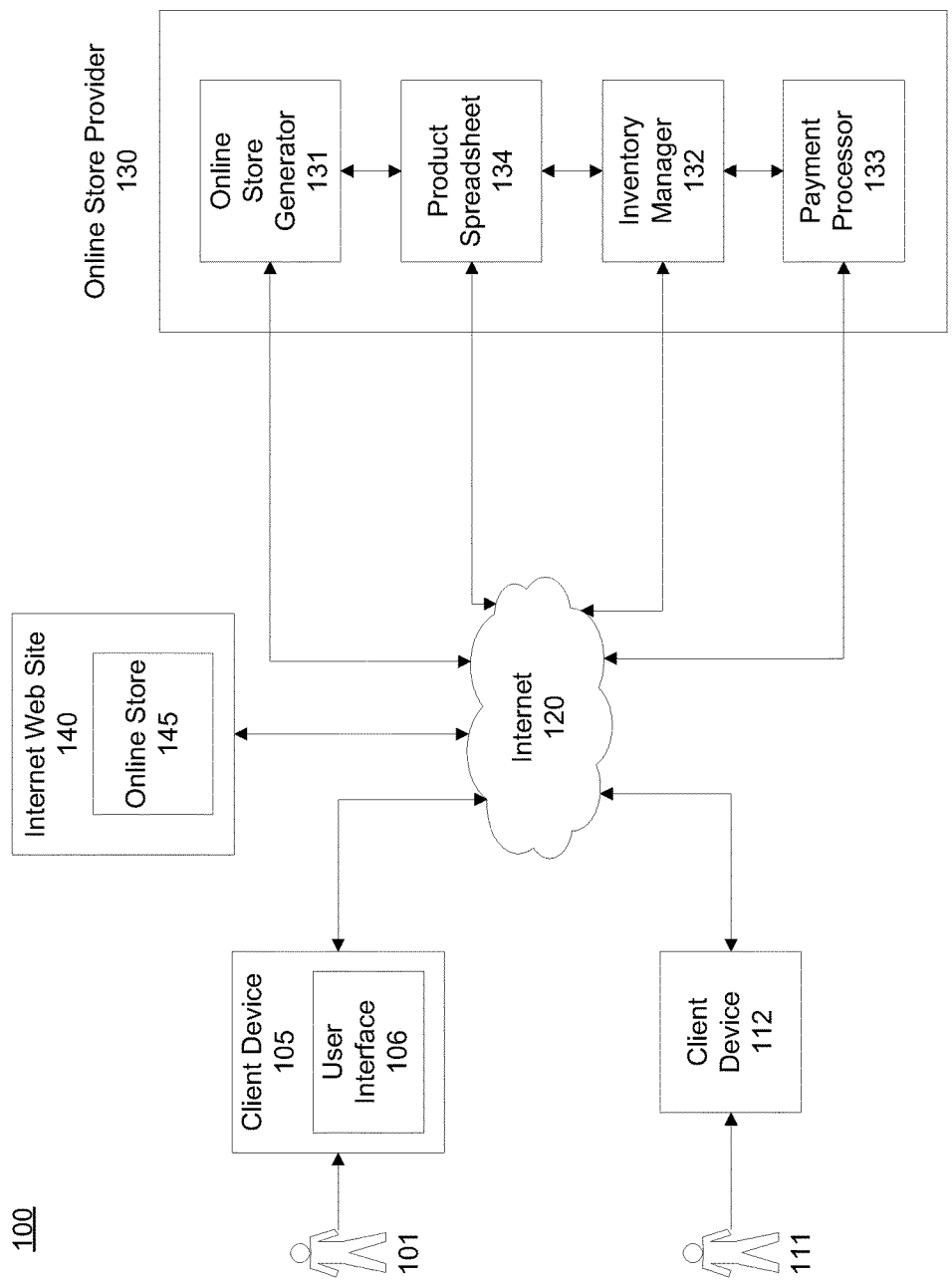
FIG. 1 is a block diagram illustrating a system for allowing a user to create an online store and for processing orders received at the online store, in accordance with certain exemplary embodiments.

Turning now to the drawings, in which like numerals indicate like elements throughout the figures, exemplary embodiments are described in detail. FIG. 1 is a block diagram illustrating a system 100 for allowing a user 101 to create an online store 145 and for processing orders received at the online store 145, in accordance with certain exemplary embodiments. The exemplary system 100 includes an online store provider 130 having an online store generator 131, a payment processor 133, and an inventory manager 132 logically coupled to a product spreadsheet 134. Each component 131-133 can include a computing system or a group of computing systems, such a as server, a web server, a mainframe computer, a workstation computer, or a group of servers or workstations. Each component 131-133 can be connected to a distributed network, such as the Internet 120. In addition or in the alternative, some or all of the components 131-133 may communicate with each other via an internal network, such as a wide area network ("WAN"), local network ("LAN"), or an intranet. In certain exemplary embodiments, each of the components 131-133 can be embodied in a single computing system (e.g., web server or server).

Although in the illustrated embodiment, each component 131-133 is associated with the online store provider 130, one or more of the components 131-133 (or the functions and processes performed by the components 131-133) may be provided by another entity. For example, one entity may provide an online store generator 131, while another entity may provide the inventory manager 132 and the payment processor 133. Any other combinations are also feasible.

The online store generator 131 generates computer-readable program code that can be embedded into an Internet website 140 to render a functional online store 145. The program code can include JavaScript, HyperText Markup Language ("HTML"), or any other computer programming language or technology. The online store generator 131 can generate the program code based on inputs received from a user 101.

The user 101 can access the online store generator 131 using a client device 105 connected to the Internet 120. The client device 105 can include a personal computer, such as a laptop or desktop computer, or a mobile device, such as a smartphone, personal digital assistant ("PDA") or a handheld computer, or any other device capable of connecting to the Internet 120. The user 101 can use the client device 105 to interact with a user interface 106 provided by the online store generator 131 to create an online store 145 for the Internet website 140. Though the user interface 106 is shown in FIG. 1 as part of the client device 105, the user interface 106 also can be displayed on the client device 105 but stored on, executed from, or otherwise based on the online store provider 130.

The user interface 106 can prompt the user 101 to enter information regarding one or more products that the user 101 intends to offer for sale via the online store 145. This product information can include one or more of a title, a product identifier (stock keeping unit ("SKU")), a price, a product description, a picture or link to a picture of the product, a video or link to a video regarding the product, a product category, optional product or accessories for the product, a selectable option (e.g., color, style, or format) of the product, whether the product is downloadable (e.g., digital file), a weight, a shipping price, an inventory of the product, a custom message, and any other information associated with the product. The product information can be stored in the product spreadsheet 134. The product spreadsheet 134 may be stored on a computer, server, or data store connected to the Internet 120 such that the product spreadsheet 134 is accessible by the online store 145.

The user interface 106 also can provide tools that allow the user 101 to preview and customize aspects of the online store 145, such as size and/or appearance. In certain exemplary embodiments, the user interface 106 can display the product information in a template and then allow the user 101 to modify the template. In certain exemplary embodiments, the user interface 106 can provide multiple templates for the user 101 to select from, display the product information in the selected template, and allow the user 101 to modify the selected template.

The online store generator 131 can use the product information and the customizations made by the user 101 to generate the computer-readable program code that can be embedded into the Internet website 140 to render a functional online store 145. The user 101 can then copy and paste or otherwise insert or embed the program code into the website 140. Thereafter, when the website 140 is accessed, the online store 145 will be displayed.

The generated computer-readable program code of the online store 145 can include a link (e.g., Uniform Resource Locator ("URL")) to the product spreadsheet 134. Anytime that the website 140 is accessed, the online store 145 can retrieve up-to-date product information (and inventory information if appropriate) from the product spreadsheet 134. The website 140 can then display this up-to-date product and inventory information.

A customer, such as customer 111, can access the online store 145 using a client device 112 (e.g., computer or mobile device). The customer 111 can navigate to the website 140 using an Internet web browser (not shown) executing on the client device 112. If the customer 111 finds a product to purchase from the online store 145, the customer 111 can initiate the purchase at the website 140, for example by selecting an "Add to Cart" icon for the product and then selecting a "Checkout" icon as described below.

The payment processor 133 allows customers 111 to make Internet purchases without supplying payment account information to an online merchant. The customer 111 and the user 101 can each have an account with the payment processor 133. The customer 111 can provide and store information associated with one or more payment options (e.g., credit card or debit card information) with the payment processor 133. When the customer 111 makes a purchase at the online store 145, the payment processor 133 can prompt the customer 111 to select one of the stored payment options and use the information associated with the selected payment option to complete the transaction. For example, the payment processor 133 can charge a selected credit card for the amount of the purchase and provide a credit to an account of the user 101 for that amount. Exemplary payment processors 133 include GOOGLE CHECKOUT and PAYPAL.

If a customer 111 has initiated a purchase of one or more products, the online store 145 can call the payment processor 133 and send information regarding the products(s) to the payment processor 133. The payment processor 133 can then provide a user interface (not shown) to allow the customer 111 to select a payment option and complete the purchase. This user interface may be provided in a new web browser window (e.g., pop-up window) on the client device 112. Alternatively, the web browser displaying the website 140 may navigate to a website of the payment processor 133.

The payment processor 133 can communicate details of completed transactions to the customer 111 and to the inventory manager 132. For example, the transaction details may include a confirmation number and a purchase receipt. If the purchased product is a downloadable product, the website 140 may then provide a link to the downloadable product. The inventory manager 132 can update the inventory information in the product spreadsheet 134 based on the purchase. For example, the inventory manager 132 can deduct the number of products purchased from the product spreadsheet 134.

Process

The components of the system 100 are described hereinafter with reference to the exemplary methods illustrated in FIGS. 2-4. The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, a skilled programmer would be able to write such computer programs to implement exemplary embodiments based on the flow charts and associated description in the application text. Therefore, disclosure of a particular set of program code instructions is not considered necessary for an adequate understanding of how to make and use the exemplary embodiments. Further, those skilled in the art will appreciate that one or more steps described may be performed by hardware, software, or a combination thereof, as may be embodied in one or more computing systems.

Figure 2:
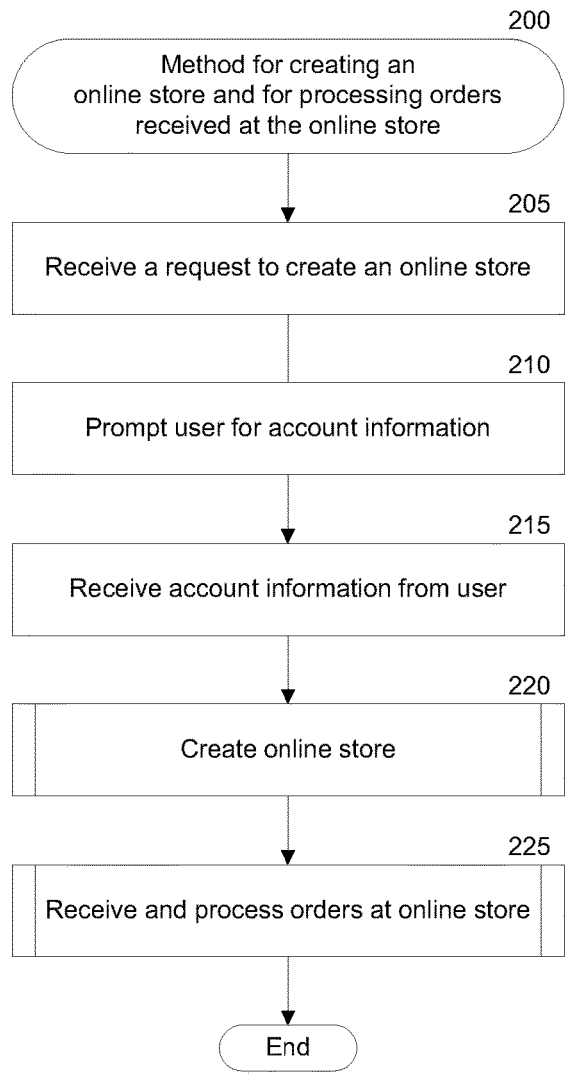
FIG. 2 is a flow chart depicting a method for creating an online store and for processing orders received at the online store, in accordance with certain exemplary embodiments.

FIG. 2 is a flow chart depicting a method 200 for creating an online store 145 and for processing orders received at the online store 145, in accordance with certain exemplary embodiments. The method 200 will be described with reference to FIGS. 1 and 2.

In step 205, the online store generator 131 receives a request from a user 101 to create an online store 145. In certain exemplary embodiments, the user 101 may navigate to an Internet website of the online store provider 130 using an Internet web browser executing on the client device 111. At this website, the user 101 may activate an icon, button, or link to submit a request to create an online store 145.

In step 210, the online store generator 131 prompts the user 101 for account information. In certain exemplary embodiments, the online store generator 131 may query the user 101 to determine if the user 101 has an account with the online store provider 130. For example, the user 101 may have an account with the payment processor 133. If the user has an account with the online store provider 130, the online store generator 131 may prompt the user 101 to log into the account.

If the user 101 does not have an account, the online store generator 131 can prompt the user for information to create an account. This information may include among other things, a name, contact information, and a user name and password. In certain exemplary embodiments, the online store generator 131 may prompt the user 101 to create an account with the payment processor 133 to receive payments via the payment processor 133. Having an account with the payment processor 133 can enable additional features for the online store 145, such as inventory tracking.

In step 215, the online store generator 131 receives the account information from the user 101. If the user 101 previously had an account with the online store provider 130, the online store generator 131 may validate a user name and password of the user 101. If the user 101 did not previously have an account with the online store provider 130, the online store generator 131 can create an account for the user 101 using the received information.

In step 220, the online store generator 131 provides a user interface 106 for the user 101 to provide information regarding products that the user 101 intends to sell via the online store 145. The online store generator 131 receives this product information and displays a preview of the online store 145 via the user interface 106. The user 101 can then customize aspects of the online store 145. When the user 101 has finished customizing the online store 145, the online store generator 131 can generate computer-readable program code that can be embedded in an Internet website 140 to render the online store 145. The user 101 can then copy and paste or otherwise embed the generated program code into the website 140 to enable the online store 145. Step 220 will be described in further detail below in connection with FIG. 3, which depicts a method 220 for creating an online store 145, in accordance with certain exemplary embodiments.

In step 225, the enabled and functional online store 145 receives and processes orders. Customers, such as customer 111, can navigate to the website 140 using a web browser executing on the client device 112. In response to the website 140 being accessed, the online store 145 can retrieve up-to-date product information from the product spreadsheet 134 and display this information on the website 140. The customer 111 can select one or more products at the online store 145 for purchase and activate an icon or button to purchase the product(s). The payment processor 133 can then provide a user interface for the customer 111 to receive payment information from the customer 111. The payment processor 133 can receive and process the payment information to complete the purchase. The payment processor 133 can then provide information associated with the transaction to the customer 111 and to the inventory manager 132. The inventory manager 132 can then update the inventory for the purchased product(s) in the product spreadsheet 134.

Although the method 200 is illustrated after step 225 as ending in FIG. 2, the online store 145 can continue to receive and process orders. In addition, the user 101 can return to the online store generator 131 to make modifications to the online store 145, such as modifications to the style and format of product information, to the size of the online store 145, or to other aspects of the appearance of the online store 145. For example, the online store generator 131 may store generated computer-readable code generated for one or more previous versions of the online store 145 created by the user 101. The user 101 may access a previous version and modify that version. The online store generator 131 can preview the modified online store 145 to the user 101 and when the user 101 has finished making modifications, the online store generator 131 can provide updated computer-readable program code that the user 101 can insert into the website 140 to render the online store 145.

In addition, the user 101 may copy and paste generated computer-readable program code that the user 101 is currently using in the online store 145 into the user interface 106. The user 101 can then preview the online store 145 in the user interface 106 and make modifications as desired. After the user 101 has finished making modifications, the online store generator 131 can generate updated computer-readable program code for the modified online store 145.

Figure 3:
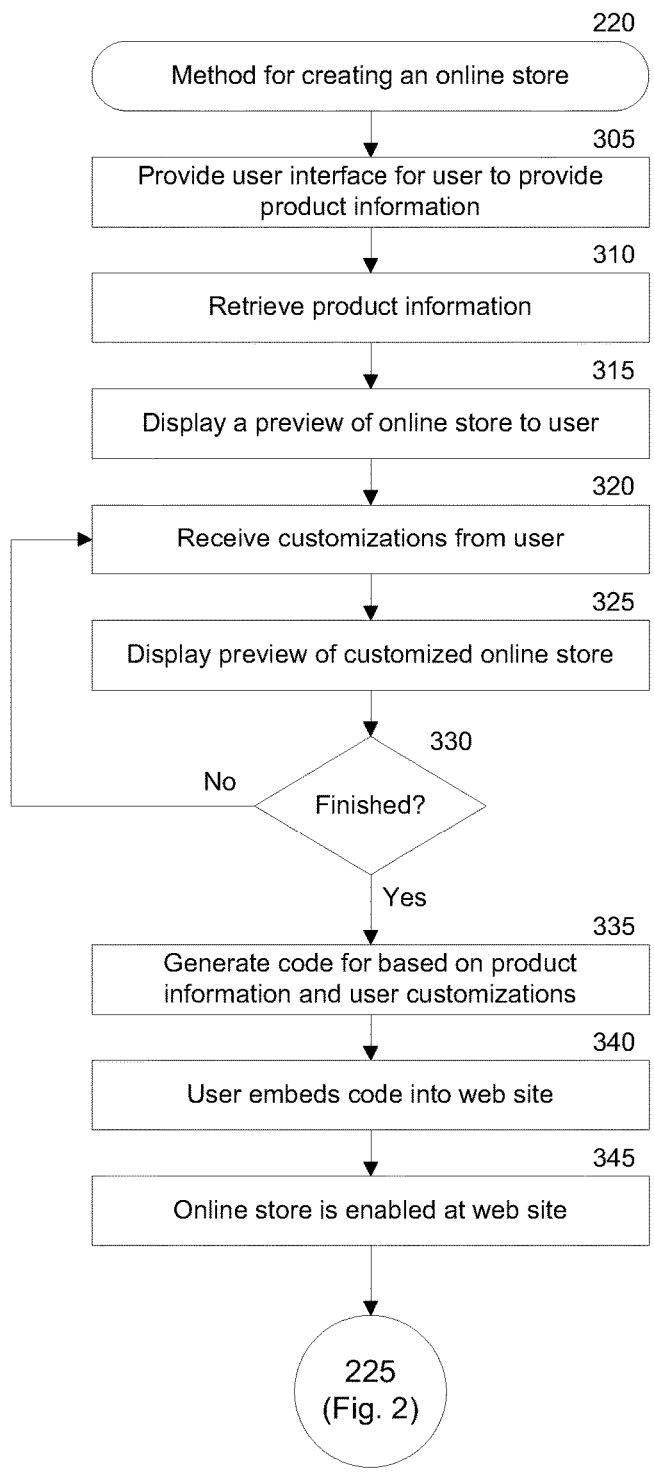
FIG. 3 is a flow chart depicting a method for creating an online store, in accordance with certain exemplary embodiments.

FIG. 3 is a flow chart depicting a method 220 for creating an online store 145, in accordance with certain exemplary embodiments, as referenced in step 220 of FIG. 2. The method 220 will be described with reference to FIGS. 1 and 3.

In step 305, the online store generator 131 provides the user interface 106 to the client device 105 via the Internet 120. The user interface 106 prompts the user 101 to provide information regarding products that the user 101 intends to sell via the online store 145. As described above, this information can include one or more of a title, a product identifier (SKU), a price, a product description, a picture or link to a picture of the product, a video or link to a video regarding the product, a product category, optional product or accessories for the product, a selectable option (e.g., color, style, or format) of the product, whether the product is downloadable (e.g., digital file), a weight, a shipping price, an inventory of the product, a custom message, and any other information associated with the product.

In certain exemplary embodiments, the user interface 106 can provide a new product spreadsheet 134 that the user 101 can enter the product information into. In such an embodiment, the online store generator 131 can create a new product spreadsheet 134 and publish the product spreadsheet 134 so that the product spreadsheet 134 is accessible via the Internet 120. For example, FIG. 5 is a block diagram depicting a screen image 500 of a portion of a graphical user interface for receiving product information from a user 101, in accordance with certain exemplary embodiments. Referring to FIG. 5, the exemplary screen image 500 includes a spreadsheet 501 that the user 101 can enter information regarding one or more products. The exemplary spreadsheet includes text entry fields for an SKU, a title, a price, a description, a quantity of inventory, a link to an image, a name for product options, a list of product options, a selection for indicating whether the product is digital (i.e., downloadable), a weight of the product, and shipping information. The spreadsheet 501 includes a "yo-yo" product 505 and a "blocks" product 510 that the user 101 intends to sale via the online store 145 and information associated with the products 505 and 510.

Referring back to FIGS. 1 and 3, in certain exemplary embodiments the user interface 106 can prompt the user 101 for a link (e.g., URL) to a pre-existing product spreadsheet 134. In certain exemplary embodiments, the user 101 may upload an existing spreadsheet or other type of document (e.g., MICROSOFT EXCEL spreadsheet document or comma separated value ("CSV") file) that contains the product information from the client device 105 to the online store generator 131. Such uploading can be performed, for example, via an online interface for uploading the spreadsheet 134, or by the user 101 emailing the spreadsheet 134 to a particular email address associated with the online store provider 130. The online store generator 131 can then parse the uploaded document to populate a product spreadsheet 134. Regardless of how the product information is obtained, the user 101 can later update the product spreadsheet 134, for example to add or remove products, change prices, edit product descriptions, or to add or remove inventory.

In step 310, the online store generator 131 retrieves the product information from the product spreadsheet 134. In step 315, the online store generator 131 displays a preview of the online store 145 via the user interface 106. In certain exemplary embodiments, the online store generator 131 can display the product information using a predefined template. In certain exemplary embodiments, the online store generator 131 can provide multiple templates for the user 101 to select from. After the user 101 selects one of the templates, the online store generator 131 can display a preview of the online store 145 based on the selected template using the product information. In certain exemplary embodiments, the online store generator 131 may display the product information using multiple templates and the user 101 can select one of the templates.

In step 320, the user 101 customizes the online store 145 using the user interface 106. In certain exemplary embodiments, the user interface 106 may include a size selection tool. The user 101 may be able to select from multiple sizes, such as large, medium, and small, or large small, and tiny. In addition, or in the alternative, the user 101 may be able to enter a height and width into a text entry box. This height and width may be based on a number of pixels or virtual pixels, or based on a percent of a webpage display area. This size selection customization allows the user 101 to embed the online store 145 into different types of websites 145 and in different parts of websites 145. For example, a user 101 may intend to display the online store in the side bar of a blog. In this example the user 101 may select a "small" or "tiny" online store 145. In another example, the sole or primary purpose of a website 140 may be to sell products via the online store 145. In this example, the user 101 may select a "large" online store 145.

In certain exemplary embodiments, the user interface 106 may allow the user 101 to select the product information that is displayed in the online store 145. For example, the user may select to display a title, description, picture, and price, while selecting not to display an SKU or inventory information.

In certain exemplary embodiments, the user interface 106 may allow the user 101 to change characteristics, such as colors or color schemes, font style or size, how the product information is displayed, or any other design characteristic that would be recognized by one of ordinary skill in the art having benefit of the present disclosure. In certain exemplary embodiments, the online store generator 131 may employ one or more cascading style sheets ("CSS"). In these embodiments, the online store generator 131 may allow the user 101 to specify a CSS for the online store 145. In addition or in the alternative, the online store generator 131 may provide a user friendly interface for the user 101 to adjust style characteristics so that knowledge of CSS is not necessary. In certain exemplary embodiments, the online store generator 131 may allow the user 101 to modify computer program code used to generate the online store 145 so that the user 101 has more control over the components of the online store 145 rendered.

In step 325, the online store generator 131 updates the displayed preview based on the user's customizations. Although this step 325 is illustrated as occurring after step 320, the preview may be updated as the user 101 makes selections or adjustments. For example, the preview may be displayed adjacent to tools used for customizing the online store 145 so that the preview can be displayed at the same time as the tools are used to customize the online store 145.

Figure 6:
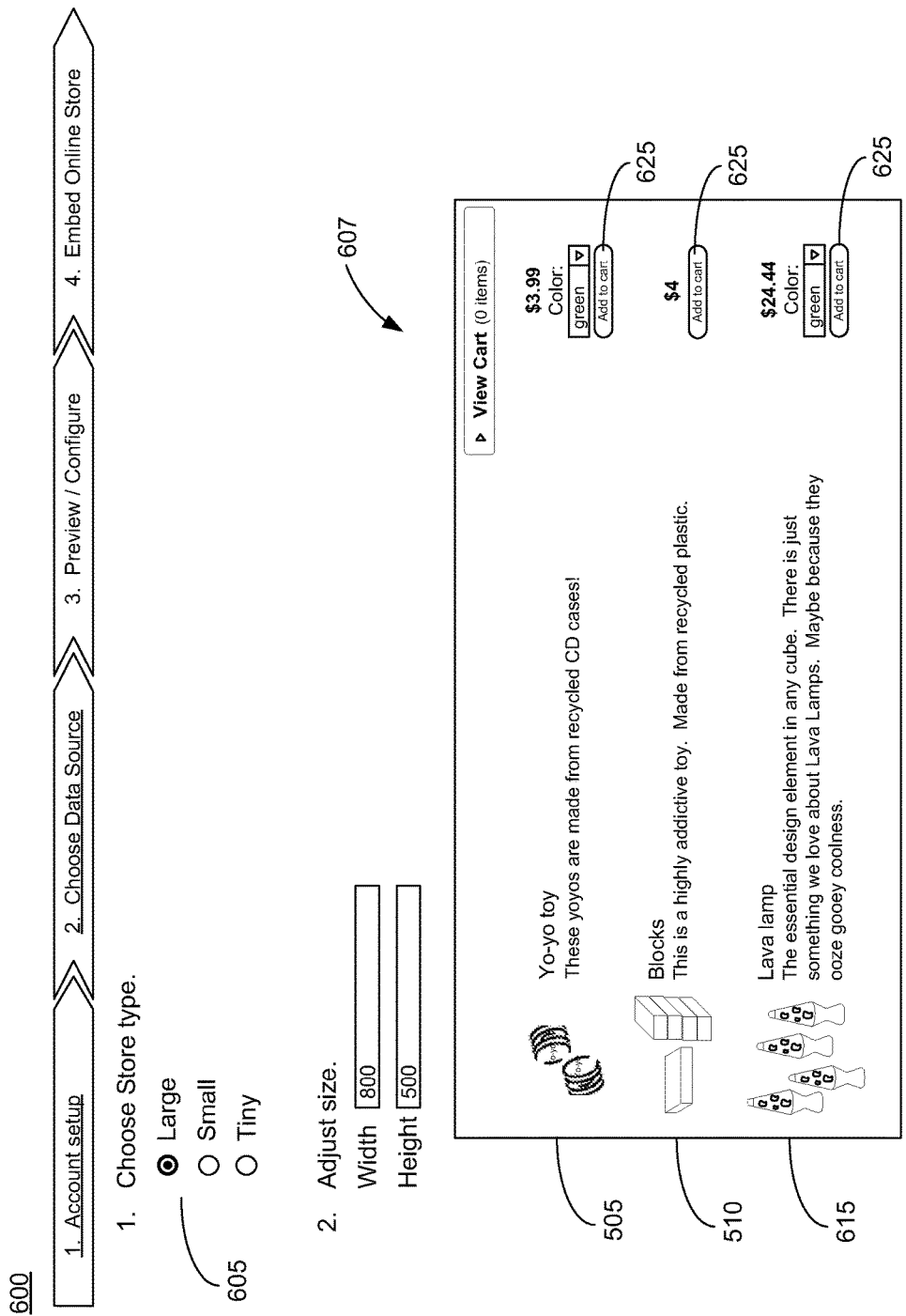
FIG. 6 is a block diagram depicting a screen image of a graphical user interface for displaying a preview of an online store and for allowing a user to customize the appearance of the online store, in accordance with certain exemplary embodiments.

FIG. 6 is a block diagram depicting a screen image 600 of a portion of a graphical user interface for displaying a preview of an online store and for allowing a user to customize the appearance of the online store, in accordance with certain exemplary embodiments. Referring to FIG. 6, the exemplary screen image 600 includes a tool 605 displayed adjacent to a display 607 previewing an online store, such as the online store 145, to the user 101. The exemplary tool 605 allows the user 101 to specify a size for the online store 145. In this screen image 600, the user 101 has selected a size of "Large" for the online store 145. The display 607 includes a preview of the "yo-yo" product 505, and the "blocks" product 510 of FIG. 5. The display 607 also includes a preview of a "lava lamp" product 615. The display 607 also includes an "Add to cart" icon that allows a customer, such as customer 111, to add the corresponding item to a virtual shopping cart.

Referring back to FIGS. 1 and 3, in step 330 the online store generator 131 determines whether the user 101 has finished creating the online store 145. In certain exemplary embodiments, the user 101 can select an icon or button to indicate that the online store 145 is completed. If the user 101 is finished creating the online store 145, the method 220 proceeds to step 335. Otherwise, the user 101 can continue customizing the online store 145 in step 320.

In step 335, the online store generator 131 generates computer-readable program code based on the product information and the user customizations. As discussed above in connection with FIG. 1, the generated program code can include JavaScript, HTML, or any other computer programming language or technology. This generated program code can include a link to the product spreadsheet 134 so that each time the online store 145 is rendered in the website 140, the online store 145 can retrieve up-to-date product and optionally inventory information. The generated program code also can include the product information that the user 101 selected to display at the online store 145 and links to pictures or videos of the products. As product information is accessed each time the website 140 is accessed, the user 101 can add or delete products and make modifications to the information regarding the products in the product spreadsheet 134 rather than generating new program code for embedding in the website 140.

In certain exemplary embodiments, the generated program code can include a shopping cart script that provides a selectable icon or button for each product. When the shopping cart icon or button is selected for a product, the generated program code can call an application that adds the product associated with the selected icon or button to a virtual shopping cart. This allows the user 101 to select more than one product for purchase at the online store 145.

FIG. 7 is a block diagram depicting a screen image 700 of a graphical user interface for displaying computer-readable program code 710, in accordance with certain exemplary embodiments. Referring to FIG. 7, the exemplary screen image 700 includes a window 705 for displaying computer-readable program code 710 generated by the online store generator 131. The generated program code 710 can be copied from the window 705 and pasted into a website, such as website 140.

Referring back to FIGS. 1 and 3, in step 340 the user 101 embeds the generated program code into an Internet website 140. In certain exemplary embodiments, the user interface 106 may display the generated program code in a text field so that the user 101 can copy and paste the generated program code into the website 140. In an alternative embodiment, the generated program code can be automatically embedded into the website 140 by the online store provider 130. For example, the user 101 can provide the online store provider 130 with sufficient information corresponding to the website 140 (e.g., the website 140 address and the user's 101 login name and password for editing the website 140) such that the online store provider 130 can edit the website 140 to embed the code. In another example, if the website 140 is hosted or otherwise associated with the online store provider 130, the online store generator 131 may compile the information provided by the user 101 and any other information appropriate for creating the online store 145 and automatically embed the generated program code into the website 140, or into other types of content management systems. In yet another example, the online store provider 130 may host the online store 145 and provide the user 101 with a URL that the user 101 can use to link to the online store 145. In an additional example, the online store provider 130 could create the code for the online store 145 to be used as a web gadget that could be embedded in a website configured for embedding web gadgets therein. Other methods of embedding the code may be recognized by one of ordinary skill in the art having the benefit of the present disclosure.

In step 345, the online store 145 is enabled at the website 140. At this point, if a customer 111 navigates to the website 140, the online store 145 will be displayed and the customer 111 may purchase a product from the online store 145. After step 345, the method 220 proceeds to step 225, as referenced in FIG. 2.

Figure 8:
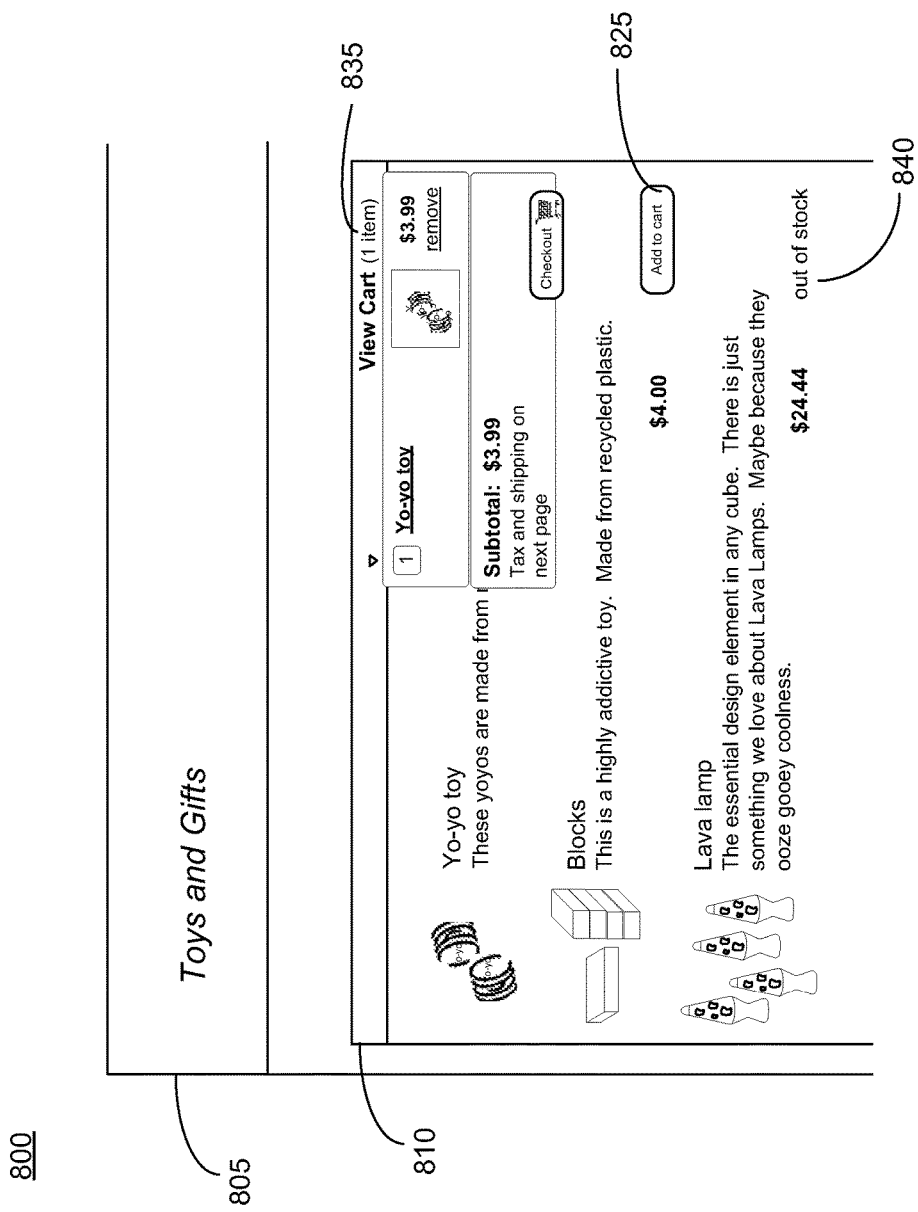
FIG. 8 is a block diagram depicting a screen image of a website having an online store, in accordance with certain exemplary embodiments.

FIG. 8 is a block diagram depicting a screen image 800 of a website 805 having an online store 810, in accordance with certain exemplary embodiments. Referring to FIG. 8, an online store 810 for selling toys and gifts has been embedded into a website 805. The exemplary online store 810 includes "Add to cart" icons 825 for each product having in-stock inventory and a virtual shopping cart 835 that displays products that a customer 111 has selected for purchase. The exemplary online store 810 also includes an out-of-stock indicator 840 for products that are not currently in stock.

Figure 4:
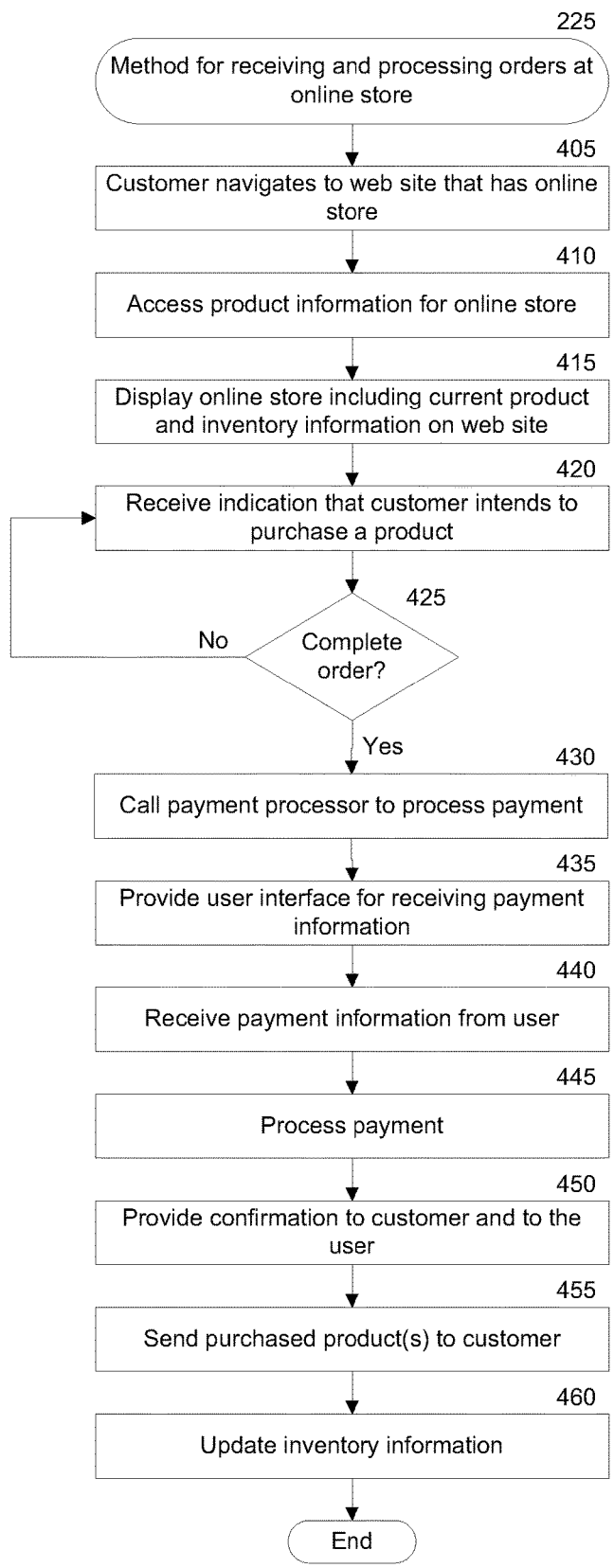
FIG. 4 is a flow chart depicting a method for processing orders received at an online store, in accordance with certain exemplary embodiments.

FIG. 4 is a flow chart depicting a method 225 for processing orders received at an online store 145, in accordance with certain exemplary embodiments, as referenced in step 225 of FIG. 2. The method 225 will be described with reference to FIGS. 1 and 4.

In step 405, a customer 111 navigates to the Internet website 140 using a web browser executing on a client device 112. For example, the customer 111 may enter a URL associated with the website 140 into an address bar of the web browser. Or, the user may select a link to the website 140.

In step 410, the online store 145 accesses the product spreadsheet 134 to obtain up-to-date product information. The online store 145 can access the product spreadsheet 134 using the link included in the generated program code. In certain exemplary embodiments, this product information can include inventory information. In such an embodiment, the online store 145 can display an indicator to indicate when a product is not in stock. In addition or in the alternative, the current inventory can be displayed by the online store 145.

In step 415, the website 140 displays the online store 145, including the up-to-date product information. The displayed online store 145 can include selectable icons or buttons to allow the customer 111 to indicate a desire to purchase the product. For example, each product may include a shopping cart button as discussed above.

In step 420, the online store 145 receives an indication that the customer 111 intends to purchase a product. Continuing the shopping cart example, the customer 111 may select the shopping cart icon or button for the product. If the shopping cart button is selected, the product may be added to a virtual shopping cart for the customer 111. In addition, if the product selected for purchase has one or more selectable options, the customer 111 may be prompted to select one of the options. For example, if a movie is selected to be purchased and the movie is available in different formats (e.g., standard definition or high definition), the online store 145 may prompt the customer 111 to select which format to purchase.

In step 425, the online store 145 determines whether the customer 111 chose to complete the order. In certain exemplary embodiments, the customer 111 may select a checkout icon or button to indicate a desire to complete the order. If the customer chooses to complete the order, the method 225 proceeds to step 430. Otherwise, the method 225 returns to step 420 for the customer 110 to select additional products. If the customer 111 has navigated away from the website 140, the method 225 may end. Prior to the method 225 ending, the online store 145 may save the information regarding the contents of the shopping cart in case the customer 111 returns. For example, the online store 145 may save the information at a web server hosting the website 140. In another example, the online store 145 may store the information in a "cookie" at the client device 112.

In step 430, the online store 145 calls the payment processor 133 to obtain and process payment information for the selected product(s). In step 435, the payment processor 133 provides a user interface to the client device 112 to prompt the customer 111 for payment information. In step 440, the payment processor 133 receives payment information from the customer 111.

In certain exemplary embodiments, the payment processor 133 may prompt the customer 111 to log into an account that the customer 111 has with the payment processor 133. If the customer 111 does not have an account, the payment processor 133 may prompt the customer to create an account and provide payment information (e.g., credit card, debit card, or other payment account information) for use with the account. Thereafter, the customer 111 can use one of the provided payment options to purchase products from online stores, such as online store 145.

In certain exemplary embodiments, the online store 145 can accept payment methods other than payment via the payment processor 133. For example, the online store 145 may accept credit card or debit card information directly or may accept payment via an alternative payment processor different than that of the payment processor 133. In such embodiments, the user 101 may update the inventory for purchased products in the product spreadsheet 134.

In step 445, the payment processor 133 processes the payment. In certain exemplary embodiments, the payment processor 133 may debit or charge a payment account selected by the customer 111 and provide a credit to a financial account of the user 101.

In step 450, the payment processor 133 provides a confirmation to the customer 111 and to the user 101 if the payment was processed successfully. The payment processor 133 may provide the customer 111 with a confirmation number, a purchase receipt, and other information associated with the transaction. The payment processor 133 also may provide transaction details to the user 101. If the payment was denied, the payment processor 133 may prompt the customer 111 to select a different payment option.

In step 455, the user 101 sends the purchased product(s) to the customer 111. If the purchased product is downloadable, the website 140 may provide a link to the downloadable product after the payment has been processed. If the purchased product(s) is not downloadable, the user 101 may mail the purchased product(s) or otherwise deliver the purchased product(s) to the customer 111.

In step 460, the inventory information is updated in the product spreadsheet 134. In certain exemplary embodiments, the payment processor 133 automatically interacts with the inventory manager 132 to update the inventor information in the product spreadsheet 134 after a transaction is completed. In certain exemplary embodiments, the user 101 updates the inventory information in the product spreadsheet 134 via the online store generator 131 or the inventory manager 132.

General

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

The exemplary embodiments can be used with computer hardware and software that performs the methods and processing functions described above. As will be appreciated by those skilled in that art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Moreover, as will be recognized by one of ordinary skill in the art having benefit of the present disclosure, computer-readable program code for performing some or all of the functions disclosed herein can be stored and/or executed on a variety of different computer-readable media. In other words, a portion of the computer-readable program code can be stored and executed on a hard disk or other media associated with one computer or server, and another portion can be stored and executed on other media associated with a different computer or server. Digital circuitry can include integrated circuits, gate arrays, building block logic, field programmable gate arrays ("FPGA"), etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method to create online stores, comprising:
    receiving, by one or more computing systems, a request from a user via a first client device to generate an online store, the online store comprising a purchasing interface;
    receiving, by the one or more computing systems and subsequent to receiving the request, information from the user via the first client device regarding: one or more products the user intends to offer for sale in the online store, and customization of the online store;
    generating, by the one or more computing systems, computer-executable instructions that provide the online store according to: the received request, the received information regarding customization, and the received information regarding one or more products;
    packaging, by the one or more computing systems, the generated computer-executable instructions as a web gadget, the generated computer-executable instructions comprising instructions presenting the purchasing interface of the online store on a customer client device;
    transmitting, by the one or more computing systems, to the user via the first client device, the web gadget; and
    embedding, by the first client device, the transmitted web gadget in a web site of the user.

2. The method of claim 1 further comprising:
    receiving, by the one or more computing systems, from the customer client device executing the computer-readable instructions embedded as the web gadget in a web page of the web site displayed on the customer client device, a request to purchase a product through the online store; and
    processing, by the one or more computing systems, the received request in accordance with the generated computer-executable instructions.

3. A computer program product to create online stores, comprising:
    a non-transitory computer-readable storage device having computer-executable program instructions embodied thereon that when executed by a computer cause the computer to create an online store, the computer-executable program instructions comprising:
        computer-executable program instructions to receive a request from a user via a first client device to generate an online store, the online store comprising a purchasing interface;
        computer-executable program instructions to receive information from the user via the first client device regarding: one or more products the user intends to offer for sale in the online store via a customer client device, and customization of the online store;
        computer-executable program instructions to generate computer-executable instructions that provide the online store according to: the received request, the received information regarding customization, and the received information regarding one or more products;
        computer-executable program instructions to package the generated computer-executable instructions as a web gadget, the generated computer-executable instructions comprising instructions presenting the purchasing interface of the online store on a customer client device;
        computer-executable program instructions to transmit to the user via the first client device, the web gadget; and
    computer-executable program instructions to embed the transmitted web gadget in a web site of the user.

4. The computer program product of claim 3, wherein the computer-executable instructions further comprise:
    computer-executable program instructions to receive, from the customer client device executing the computer-readable instructions embedded as the web gadget in a web page of the web site displayed on the customer client device, a request to purchase a product through the online store; and
    computer-executable program instructions to process the received request in accordance with the generated computer-executable instructions.

5. A system to create online stores, comprising:
    a storage device; and
    a processor communicatively coupled to the storage device, wherein the processor executes application code instructions that are stored in the storage device and to cause the system to:
    receive a request from a user via a first client device to generate an online store, the online store comprising a purchasing interface;
    receive information from the user via the first client device regarding: one or more products the user intends to offer for sale in the online store via a customer client device, and customization of the online store;
    generate computer-executable instructions that provide the online store according to: the received request, the received information regarding customization, and the received information regarding one or more products;
    package a subset of the generated computer-executable instructions as a web gadget, the subset of the generated computer-executable instructions comprising instructions presenting the interface of the online store on a customer client device;
    transmit to the user via the first client device, the generated web gadget; and;
    embed the transmitted web gadget in a web site of the user.

6. The system of claim 5, wherein the application code instructions further cause the system to:
    receive, from the customer client device executing the computer-readable instructions embedded as the web gadget in a web page of the web site displayed on the customer client device, a request to purchase a product through the online store; and
    process the received request in accordance with the generated computer-executable instructions.

* * * * *